(12) United States Patent
Motegi et al.

(10) Patent No.: US 8,023,460 B2
(45) Date of Patent: Sep. 20, 2011

(54) RADIO BASE STATION AND USER COMMON DATA TRANSMISSION METHOD

(75) Inventors: Masayuki Motegi, Yokohama (JP); Yasuhiro Kato, Yokohama (JP); Minami Ishii, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 630 days.

(21) Appl. No.: 12/067,033

(22) PCT Filed: Sep. 8, 2006

(86) PCT No.: PCT/JP2006/317903
§ 371 (c)(1),
(2), (4) Date: Oct. 1, 2008

(87) PCT Pub. No.: WO2007/032288
PCT Pub. Date: Mar. 22, 2007

(65) Prior Publication Data
US 2009/0052407 A1     Feb. 26, 2009

(30) Foreign Application Priority Data
Sep. 14, 2005   (JP) .................................. 2005-267669

(51) Int. Cl.
*H04W 4/00* (2009.01)
*H04B 7/26* (2006.01)
(52) U.S. Cl. ........................................ 370/329; 370/341
(58) Field of Classification Search ........................ None
See application file for complete search history.

(56) References Cited

U.S. PATENT DOCUMENTS

| | | | |
|---|---|---|---|
| 5,916,309 A | 6/1999 | Brown et al. | |
| 6,577,599 B1* | 6/2003 | Gupta et al. | 370/236 |
| 7,079,854 B2* | 7/2006 | Lee et al. | 455/466 |
| 7,307,971 B2* | 12/2007 | Park et al. | 370/331 |
| 7,586,874 B2* | 9/2009 | Rudolf et al. | 370/330 |
| 2002/0075857 A1* | 6/2002 | LeBlanc | 370/352 |
| 2002/0150048 A1* | 10/2002 | Ha et al. | 370/231 |
| 2003/0126031 A1 | 7/2003 | Asami | |
| 2005/0147040 A1* | 7/2005 | Vayanos et al. | 370/235 |
| 2006/0206823 A1 | 9/2006 | Asami | |

(Continued)

FOREIGN PATENT DOCUMENTS

JP    2003-348643    12/2003

(Continued)

OTHER PUBLICATIONS

International Search Report (English & Japanese) for PCT/JP2006/317903 mailed Dec. 26, 2006 (7 pages).

(Continued)

*Primary Examiner* — Chi Pham
*Assistant Examiner* — Soon-Dong Hyun
(74) *Attorney, Agent, or Firm* — Osha • Liang LLP

(57) ABSTRACT

A radio base station transmits user common data provided from a user common data control apparatus connected to a communication network to a plurality of mobile stations by radio. The radio base station includes a frame loss detection unit configured to detect loss of user common data that occurs on a transmission route between the radio base station and the user common data control apparatus, and a timing adjustment unit configured to change transmission timing of the user common data for the mobile station according to the loss of the user common data.

16 Claims, 9 Drawing Sheets

U.S. PATENT DOCUMENTS

2008/0151805 A1* 6/2008 Vayanos et al. ............... 370/312
2008/0291866 A1* 11/2008 Fukui ........................... 370/328

FOREIGN PATENT DOCUMENTS

| TW | 377421 | 12/1999 |
|---|---|---|
| TW | 384428 | 3/2000 |
| TW | 528976 | 4/2003 |
| TW | 552539 | 9/2003 |
| WO | 2005-120119 | 12/2005 |

OTHER PUBLICATIONS

Written Opinion of ISA (Japanese Only) for PCT/JP2006/317903 mailed Dec. 26, 2006 (4 pages).

3GPP TS 25.346 V6.5.0 "Introduction of the Multimedia Broadcast Multicast Service (MBMS) in the Radio Access Network (RAN)", Jun. 2005 (60 pages).

Taiwanese Office Action for Application No. 95133640, mailed on Jul. 22, 2009 (6 pages).

esp@cenet Patent Abstract for Taiwanese Publication No. 384428, publication date Mar. 11, 2000. (1 page).

esp@cenet Patent Abstract for Taiwanese Publication No. 552539, publication date Sep. 11, 2003. (1 page).

esp@cenet Patent Abstract for Taiwanese Publication No. 528976, publication date Apr. 21, 2003. (1 page).

English Abstract for Taiwanese Publication No. 377421, publication date Dec. 21, 1999 (1 page).

* cited by examiner

RADIO BASE STATION AND USER COMMON DATA TRANSMISSION METHOD

TECHNICAL FIELD

The present invention relates to a data transmission method and a radio base station for transmitting user common data such as multimedia broadcast/multicast service (MEMS) data.

BACKGROUND ART

In the UTRAN architecture of MBMS in 3GPP Release 6, as combining methods of MBMS transport channels (MTCH), two main types are defined as selection combining and in-phase combining (soft combining) (refer to 3GPP TS25.346, for example).

These combining methods are used according to environment, in which the selection combining is normally performed in an environment of Inter-Node B, that is, among base stations, and the soft combining is normally performed in an environment of Intra-Node B, that is, among sectors. The reason is that the system architecture of Release 6 is an asynchronous system.

However, in a future mobile communication system Evolved-UTRAN (E-UTRAN) for which discussions are started in 3GPP(3rd generation partnership project), synchronization among base stations are assumed as the system architecture. For example, based on synchronization by GPS (Global Positioning System), it is assumed to aim high performance by performing soft combining on MBMS data from adjacent cells among base stations.

In this case, since it is necessary to transmit a same signal among adjacent base stations, that is, in Inter-Node B, data loss on a transmission route to the base stations becomes a large problem. To solve the problem, it is necessary to detect frame loss in an interface between a base station (Node B) and a radio network control apparatus (RNC: Radio Network Controller) or between a base station and a MBMS server.

In MBMS transmission of Release 6, since soft combining is defined only in Intra-Node B, that is, only among cells (sectors), such problem does not occur. Under a same base station (Node B), since MTCH that is transmitted in the cells (sectors) is the same, frame loss becomes the same among all cells (sectors). That is, the frame loss is closed in Node B.

In addition, since selection combining is performed in Inter-Node B, that is, among base stations, frame loss between the base station and the radio network control apparatus is not a problem. This is because, even though there is a frame loss in one Node B, there is no problem if another one can receive the frame.

DISCLOSURE OF THE INVENTION

Problem to be Solved by the Invention

Thus, an object of the present invention is to provide a radio base station and a transmission method that can transmit same user common data at a same timing among adjacent cells even when frame loss occurs on a cable transmission route in a synchronous system in which base stations are synchronized with each other.

Means for Solving the Problem

To solve the above-mentioned problem, according to a first aspect, a radio base station that transmits user common data distributed from a user common data control apparatus connected to a communication network to a plurality of mobile stations by radio is provided. The radio base station includes:

(a) a frame loss detection unit configured to detect loss of user common data on a transmission route between the radio base station and the user common data control apparatus; and (b) a timing adjustment unit configured to change transmission timing of the user common data for the mobile station according to the loss of the user common data.

According to a second aspect, a user common data transmission method for transmitting user common data distributed from a user common data control apparatus connected to a communication network to a plurality of mobile stations by radio is provided. The transmission method includes:

(a) a step of detecting, in the radio base station, loss (frame loss) of user common data on a transmission route between the radio base station and the user common data control apparatus;

(b) a step of calculating, in the radio base station, a change amount of transmission timing according to the loss of the user common data;

(c) a step of changing the transmission timing of the user common data for the mobile station based on the calculated change amount; and (d) a step of transmitting the user common data to the mobile station at the changed transmission timing.

EFFECT OF THE INVENTION

According to the base station configuration and the method, even when frame loss occurs between the user common data control apparatus and the radio base station, a same timing can be kept so that same user common data can be transmitted among radio base stations.

DESCRIPTION OF REFERENCE SIGNS 50 core network
10 radio access network (RAN)
100, $100_1$, $100_2$, $100_3$, $100_4$, $100_5$, $100_6$ mobile station (UE)
200, $200_1$, $200_2$, $200_3$ radio base station (Node B)
300 broadcast/multicast service center (BM-SC)
350, $350_1$, $350_2$, $350_3$, $350_4$ route control apparatus (AR)
400 MBMS server

PREFERRED EMBODIMENTS FOR CARRYING OUT THE INVENTION

In the following, the preferred embodiments of the present invention are described with reference to the attached figures. By the way, in the description of the embodiments, same symbols are used for indicating parts having same functions in all figured, and repeated explanations are avoided.

Figure 1:
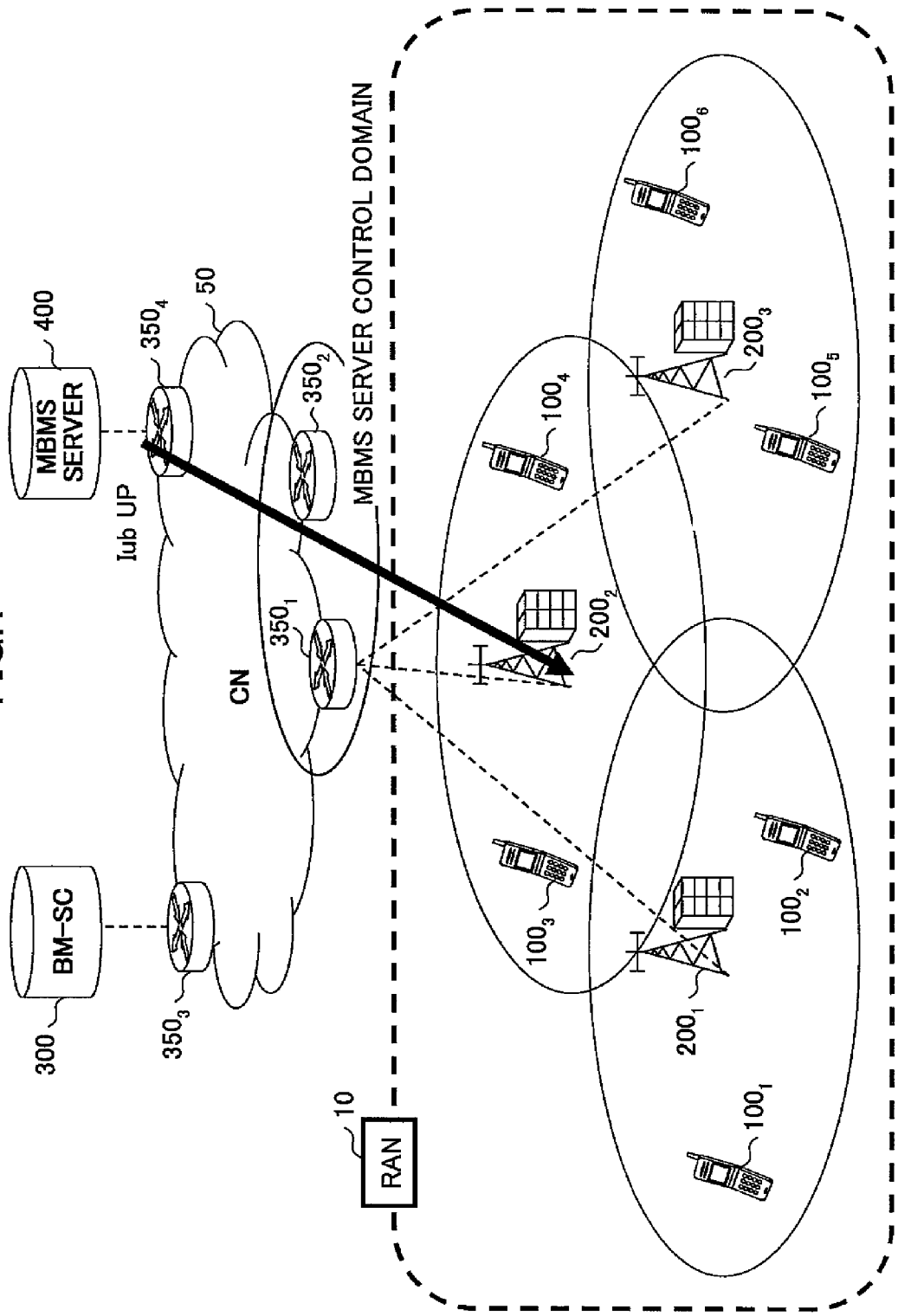
FIG. 1 is a schematic diagram showing a radio communication system of a first embodiment of the present invention.

FIG. 1 is a schematic block diagram of a radio communication system of a first embodiment of the present invention. The radio communication system includes a core network (CN) 50 and a radio access network (RAN) 10.

The core network 50 includes route control apparatuses (AR: Access Router) 350 ($350_1$, $350_2$, $350_3$, $350_4$), a communication network that connects the route control apparatuses 350 each other, a broadcast/multicast service center (BM-SC) 300 for controlling distribution of MBMS (Multimedia Broadcast Multicast Service) content, and a MBMS server 400 for controlling MBMS data transmission to the RAN 10. The MBMS server 400 is located between the BM-SC 300 and the RAN 10, and functions as a control node for distributing MBMS data, to the RAN 10, that is an example of user common data.

On the other hand, the radio access network 10 includes a plurality of radio base stations (Node B) 200 ($200_1$, $200_2$, $200_3$), and a plurality of mobile stations (UE: User Equipment) 100 ($100_1$, $100_2$, $100_3$, $100_4$, $100_5$, $100_6$) for performing communication with the radio base stations 200 via a radio interface.

The MBMS server 400 may be configured to manage only a plurality of radio base stations 200 connected under one route control apparatus 350, or may be configured to control a plurality of route control apparatuses 350 together. In the latter case, a plurality of route control apparatuses, that are the route control apparatuses $350_1$ and $350_2$, for example, form a MBMS server control domain.

In the radio communication system of the first embodiment, user common data that is MBMS data, for example, is distributed from the MBMS server 400 connected to a communication network that is the core network 50, for example, so that the MBMS data is transmitted to a plurality of mobile stations 100 via the radio base stations 200.

Figure 2A:
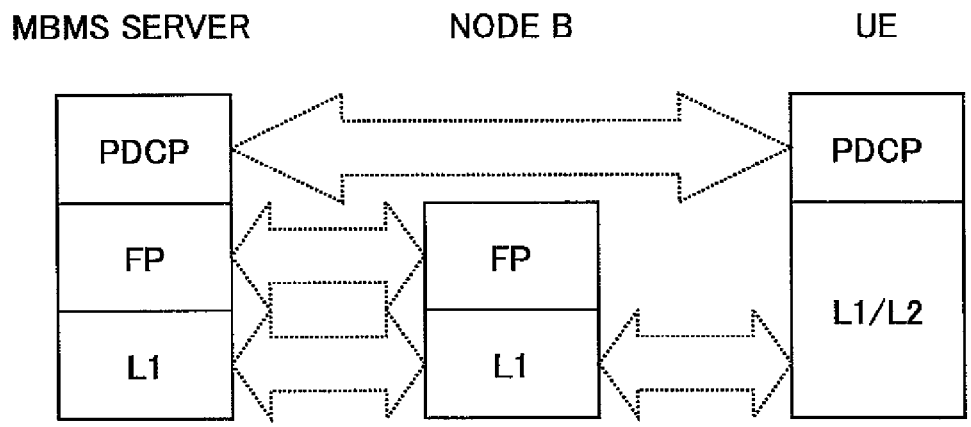
FIG. 2A is a figure showing an example using the frame protocol (FP) as a transmission protocol between a MBMS server and a radio base station.

FIG. 2A is a figure showing a protocol configuration among the MBMS server 400, the radio base station (Node B) 200, and a mobile station (UE). Packet data convergence protocol (PDCP) is defined between the MBMS server 400 and the mobile station (UE). Between the MBMS server 400 and the radio base station (Node B) 200, frame protocol (FP) or GTP-U (U plane) is defined. FP performs control for transferring data in a cable part, channel synchronization for performing data arrival synchronization control necessary for soft combining, and inter-node synchronization control and the like.

Figure 2B:
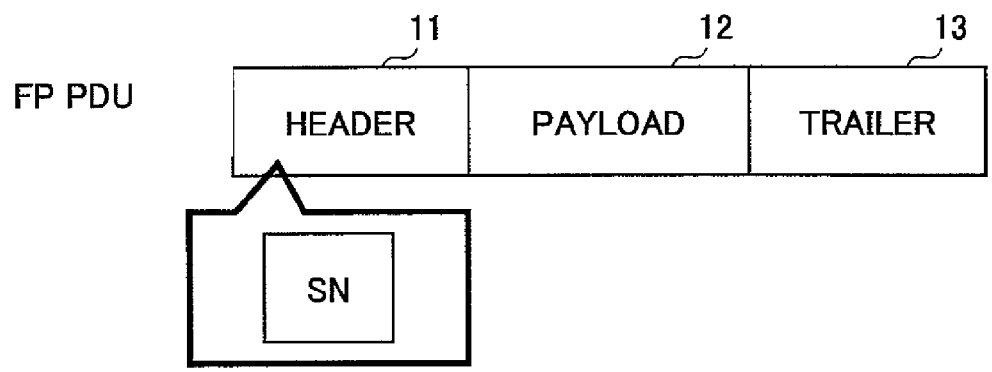
FIG. 2B is a figure showing a configuration example of FP-PDU.

FIG. 2B shows FP protocol data unit (PDU) that is a data unit, defined in FP, handled by UDP (user datagram protocol). FP-PDU includes a header 11, a payload 12, and a trailer 13. The header 11 at least stores a sequence number (SN) for detecting frame loss. The sequence number indicates which part of original data is stored in the PDU. The header 11 may store other information in addition to the sequence number.

Figure 3:
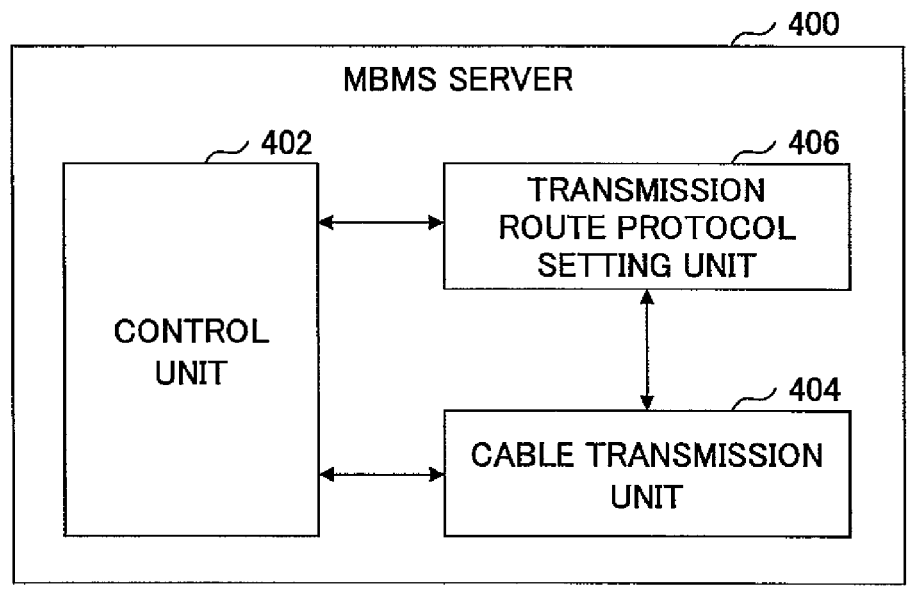
FIG. 3 is a schematic block diagram of the MBMS server used in the first embodiment.

FIG. 3 shows a schematic block diagram of the MBMS server 400 used in the first embodiment. The MBMS server 400 includes a control unit 402, and a cable transmission unit 404 and a transmission route protocol setting unit 406 that are connected to the control unit 402. The transmission route protocol setting unit 406 and the cable transmission unit 404 are connected with each other.

The control unit 402 controls each functional entity in the MBMS server 400, and manages operation of the whole of the MBMS server 400. In addition, the control unit 402 temporarily stores MBMS data delivered from the BM-SC 300 in its buffer.

The cable transmission unit 404 performs processes, specific to cable transmission route, necessary for performing transmission using the FP protocol that is defined between the MBMS server 400 and the radio base station 200.

The transmission route protocol setting unit 406 generates a PDU of the FP protocol defined between the MBMS server and the radio base station 200.

Figure 4:
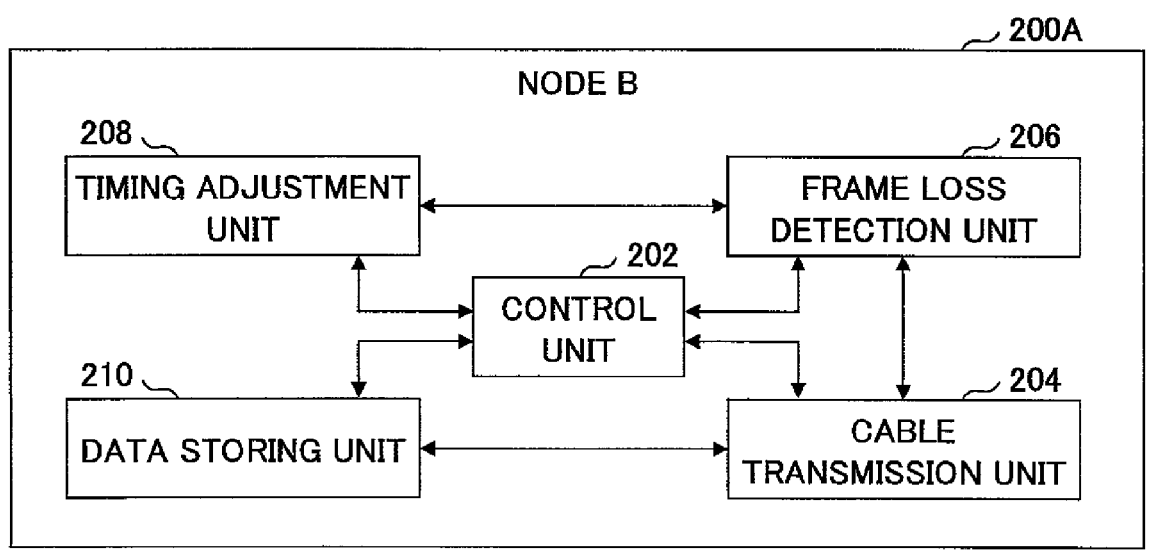
FIG. 4 is a schematic block diagram of the radio base station used in the first embodiment.

FIG. 4 is a schematic block diagram of a radio base station 200A used in the first embodiment. The radio base station 200A includes a control unit 202, a cable transmission unit 204, a frame loss detection unit 206, a timing adjustment unit 208 and a data storing unit 210. The frame loss detection unit 206 is connected to the cable transmission unit 204 and the timing adjustment unit 208. The data storing unit 210 is connected to the cable transmission unit 204.

The control unit 202 controls each functional entity provided in the radio base station 200A, and manages operation of the whole of the radio base station 200.

The cable transmission unit 204 performs processes, specific to cable transmission route, necessary for performing transmission using the FP protocol defined between the radio base station 200A and the MBMS server 400.

The frame loss detection unit 206 checks a sequence number (SN) stored in a PDU of the FP protocol to detect a dropout of a sequence number (detect frame loss). That is, the frame loss detection unit 206 detects a sequence number corresponding to a lost PDU.

The timing adjustment unit 208 calculates a lost data amount based on PDU and a dropped sequence number, that is, a sequence number corresponding to the lost PDU. In addition, the timing adjustment unit 208 changes transmission timing for the mobile station 100 based on a transport block size (TBS) indicating a data amount that can be transmitted within 1 TTI (Transmission Time Interval) when using a radio channel, according to dropouts of sequence numbers, that is, according to a number of sequence numbers corresponding to lost PDUs. For example, the timing adjustment unit 208 calculates a number of TTIs or a number of slots that should be skipped as the transmission timing, that is, calculates a change amount of transmission timing according to the number of sequence numbers corresponding to the lost PDUs. By the way, one TTI may include a plurality of slots.

The data storing unit 210 stores MBMS data that is transmitted from the MBMS server 400 while transmission (distribution) of MBMS data to the mobile station 100 is being skipped. For example, the data storing unit 210 stores MBMS data received via the cable transmission unit 204.

Figure 5:
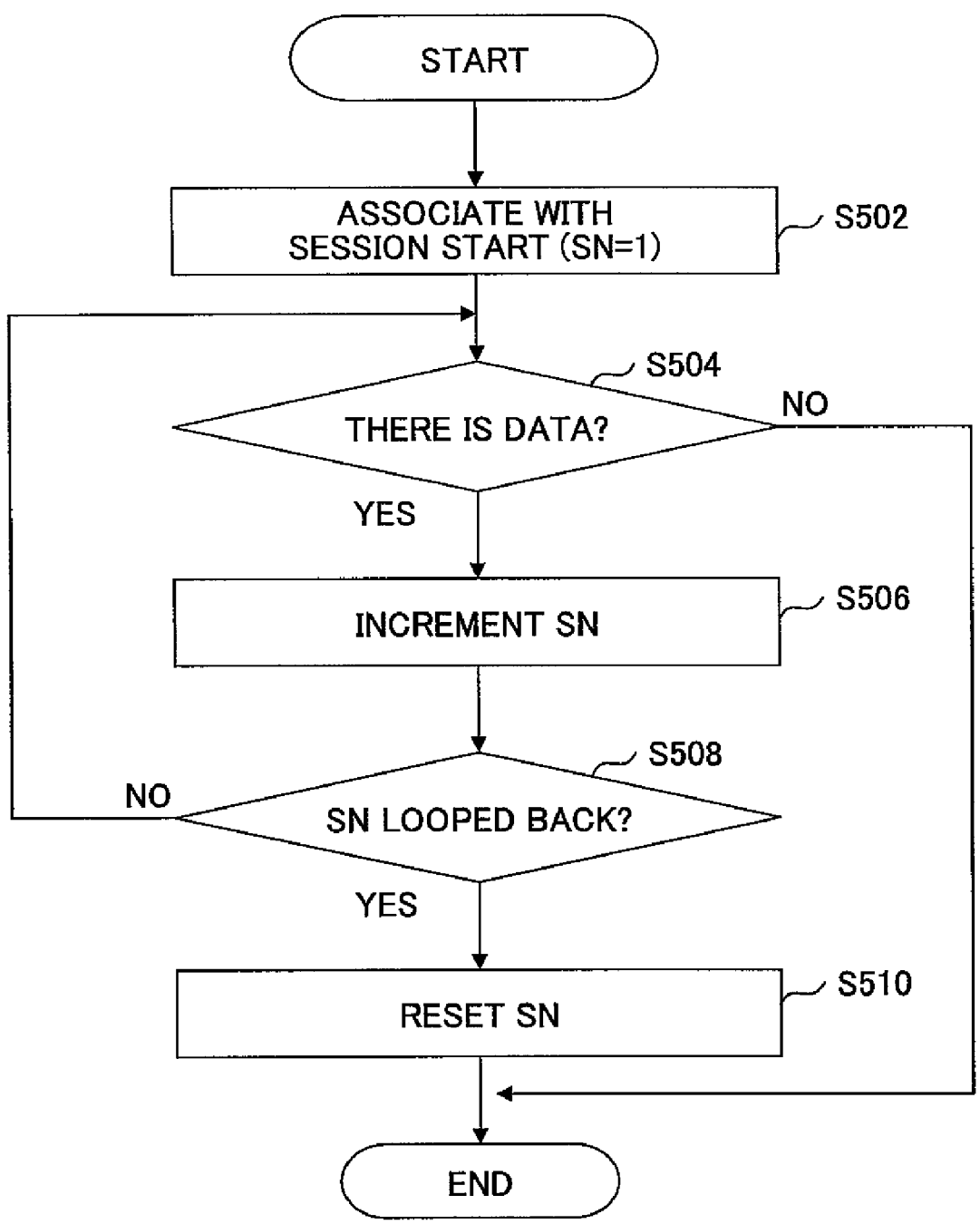
FIG. 5 is a flowchart showing operation of the MBMS server in the first embodiment.

FIG. 5 shows a flowchart showing operation of the MBMS server 400 used in the first embodiment. On the transmission route between the MBMS server 400 and the radio base station 200A, a transmission protocol, that is the FP protocol, for example, for transmitting MBMS data that is transmitted by the MBMS server 400 is defined beforehand (refer to FIG. 2A).

When the BM-SC 300 transmits MBMS data to the MBMS server 400, the control unit 402 of the MBMS server 400 stores the received MBMS data into its buffer (not shown in the figure). At a time of start of a session, the transmission route protocol setting unit 406 of the MBMS server 400 resets the sequence number (SN) into an initial value, that is, resets into SN=1, for example, wherein the sequence number (SN) is provided to MBMS data that is provided from the BM-SC 300 and that is transmitted to the radio base station 200 via the MBMS server 400 (step S502).

In the present embodiment, it is assumed that the BM-SC 300 connected to the core network 50 transmits same MBMS data a plurality of times. But, the present embodiment is not limited to this example, and the BM-SC 300 may be configured to transmit MBMS data only once. When transmitting the same MBMS data a plurality of times, the transmission route protocol setting unit 406 performs checking for resetting the sequence number for each one session. In addition, when the transmission route protocol setting unit 406 uses up sequence numbers in one session, the transmission route protocol setting unit 406 uses the sequence number as it is by resetting it as described later.

Next, the control unit 402 determines whether there is the MBMS data provided from the BM-SC 300 in the buffer (step S504). At the same, the control unit 402 checks a number of times of session repetition.

When there is MBMS data in a same repetition time (Yes in S504), the transmission protocol setting unit 406 increases the sequence number of the transmission route PDU to be transmitted by a predetermined number, that is, by 1, for example (step S506). On the other hand, when the MBMS data to be transmitted is not stored in the buffer (No in S504), the process is terminated.

Next, it is checked whether the prepared sequence number is looped back (step S508). When the sequence number is looped back (Yes in S508), the sequence number is reset (step S510). On the other hand, when the sequence number is not looped back (NO in S508), the step returns to step S504. That is, until one session ends, processes from step S504 to step S508 are repeated.

Figure 6:
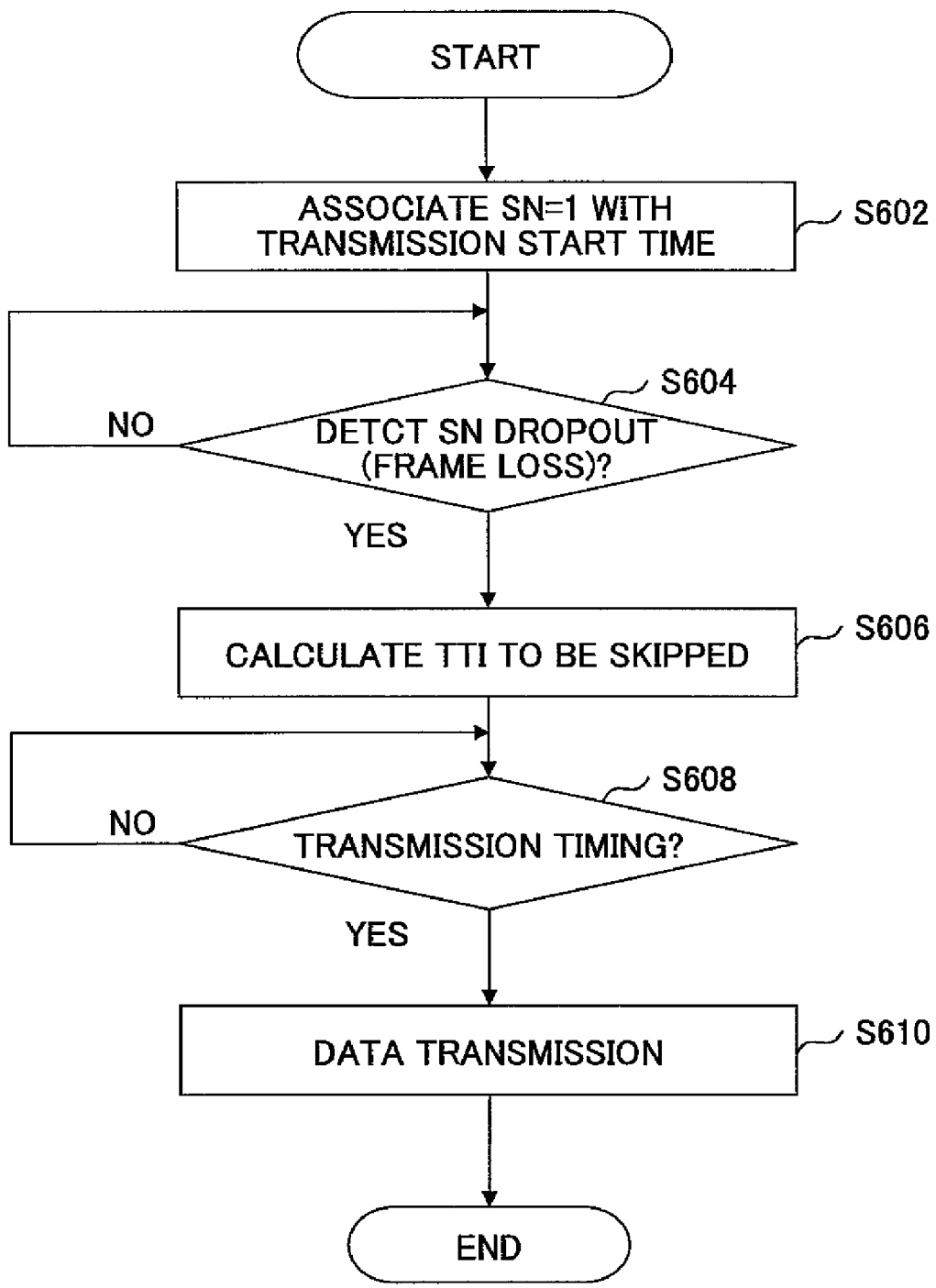
FIG. 6 is a flowchart showing operation of the radio base station used in the first embodiment.

FIG. 6 is a flowchart showing operation of the radio base station 200A according to the first embodiment. The radio base station 200 transmits MBMS data transmitted from the MBMS server connected to a communication network that is the core network 50, for example, to a plurality of mobile stations.

The control unit 202 temporarily stores the MBMS data distributed from the MBMS server 400 into the data storing unit 210. In addition, based on the PDU forming the MBMS data, the control unit 202 associates an initial value (SN=1, for example) of the sequence number stored in this PDU with a transmission time (absolute time) specified from the MBMS server 400 (step S602). As a result, radio base stations synchronize with each other based on the absolute time, so that each radio base station transmits same MBMS data at a same timing according to the sequence number associated with the transmission time. In the following, each radio base station performs processes based on the transmission time.

Next, the frame loss detection unit 206 determines whether there is an dropout of the sequence number stored in the transmission route PDU transmitted from the MBMS server 400, that is, determines whether there is any lost PDU (step S604). When a dropout of the sequence number is detected, that is, when there is a lost PDU (YES in S604), the timing adjustment unit 208 calculates a lost data amount from the sequence number and the PDU of the FP. Then, the timing adjustment unit 208 obtains a number of TTIs that should be skipped, that is, obtains a change amount of transmission timing as transmission timing obtained according to a number of sequence numbers corresponding to lost PDUs, so as to determine next transmission timing based on the change amount (step S606).

For example, assuming that a data amount that can be transmitted within 1 TTI on a radio channel is A bits, and that a data amount transmitted by the FP protocol is B bits. Also, it is assumed that the data amount B bits transmitted by PP are formed by combining a plurality of data units each being C bits, for example. Then, relationship of C<A<B holds true among these data amounts. In addition, the data amount A transmitted by 1 TTI is smaller than twice C bits (C<A<2C). That is, a case in which only one data unit can be transmitted within 1 TTI is assumed, so that padding is performed for the remaining part.

As an example, when only one sequence number is dropped, a number of TTIs to be skipped is [B/C], wherein "[ ]" represents a maximum natural number that does not exceed a value in "[ ]". In this embodiment, the header 11 and the trailer 13 of the PDU for data transmission in radio layer are not considered. But, when they are considered, it can be obtained by subtracting bits of the header 11 and the trailer 13 from the data amount A bits that can be transmitted within 1 TTI. By the way, calculation of the transmission timing in step S606 is not limited to the above-mentioned method, and other calculation methods can be used.

On the other hand, when any dropout of the sequence number is not detected, that is, when there no lost PDU (No in S604), the process returns to step S604.

Next, the timing adjustment unit 208 determines whether current time is the next transmission timing calculated in step S606 (step S608). When it is the transmission timing (Yes in S608), the MBMS data temporarily stored in the data storing unit 210 is distributed at the transmission timing (step S610). On the other hand, when it is not the transmission timing (No in step S608), the process returns to step S608 so that the MBMS data after the dropout of the sequence number continues to be stored in the data storing unit 210 until the transmission timing comes.

Accordingly, when a transmission protocol is predefined for transmission of the MBMS data transmitted by the MBMS server 400 on a transmission route between the MBMS server 400 and the radio base station 200A, the radio base station 200A detects loss of MBMS data, that is, frame loss, for example, between the MBMS server 400 and the radio base station 200A based on the sequence number, and changes transmission timing of the MBMS data for the mobile station according to the loss of MBMS data, so that it becomes possible to transmit the same MBMS data at the same timing among adjacent base stations. Therefore, the mobile station can perform soft combining efficiently among a plurality of base stations.

Next, a radio communication system of the second embodiment of the present invention is described with reference to FIGS. 7-10. In the second embodiment, a case is described in which PDCP and RLC that are defined between the MBMS server and the mobile station (UE) are used as a transmission route protocol. But, the present embodiment is not limited to those, and other transmission route protocol may be defined between the MBMS server and the mobile station.

Figure 7:
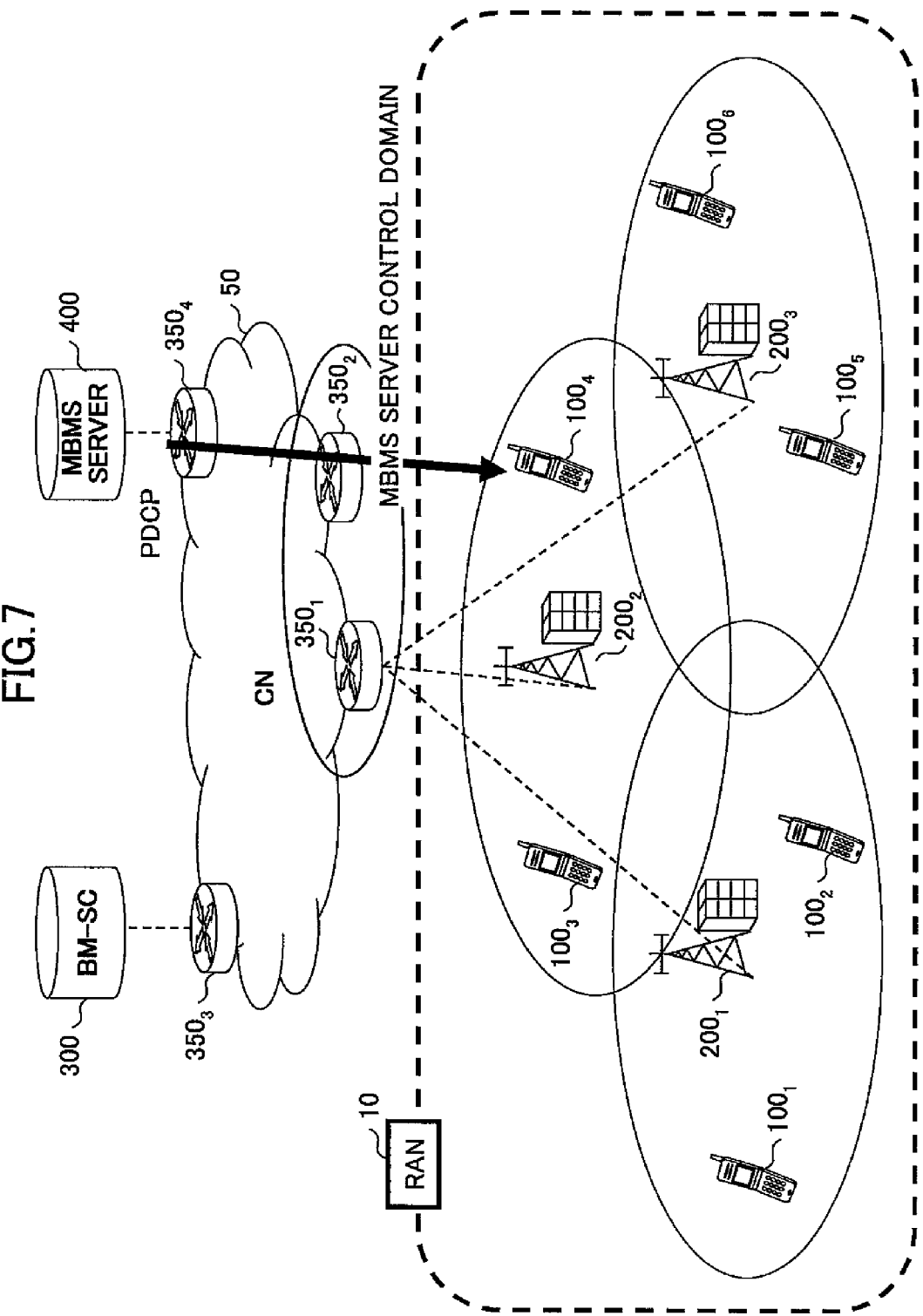
FIG. 7 is a schematic diagram showing a radio communication system of a second embodiment of the present invention.

FIG. 7 shows a schematic diagram showing a radio communication system of the second embodiment. This radio communication system has a configuration same as the radio communication system described in the first embodiment, and includes a core network 50 and a radio access network (RAN) 10.

The core network 50 includes route control apparatuses 350 ($350_1$, $350_2$, $350_3$, $350_4$), a communication network to which the route control apparatus 350 connects, a BM-SC 300 that is a control station that controls distribution of MBMS data, and a MBMS server 400 that controls MBMS data distribution to the RAN 10. Similarly to the first embodiment, the MBMS server 400 is located between the BM-SC 300 and the RAN 10, and functions as a control node for distributing MBMS data in the RAN 10.

The RAN 10 includes a plurality of radio base stations 200 ($200_1$, $200_2$, $200_3$), and a plurality of mobile stations 100 ($100_1$, $100_2$, $100_3$, $100_4$, $100_5$, $100_6$) for performing communication with the radio base stations 200 via a radio interface.

The MBMS server 400 may be configured to manage only a plurality of radio base stations 200 connected under one route control apparatus 350, or may be configured to control a plurality of route control apparatuses 350 together. In the latter case, a plurality of route control apparatuses $350_1$ and $350_2$ that are subjects for control form a MBMS control domain.

In the radio communication system of the second embodiment, MBMS data is transmitted from the MBMS server 400 connected to a communication network, that is the core network 50, for example, to the RAN 10, and this MBMS data is transmitted to a plurality of mobile stations via the radio base stations 200.

Figure 8A:
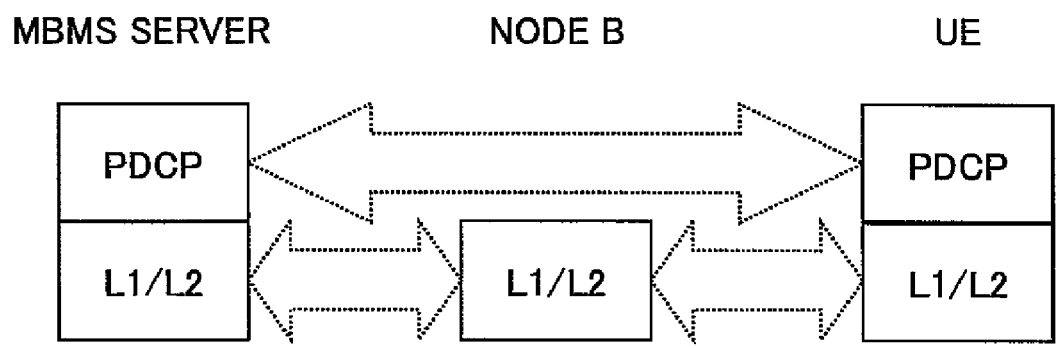
FIG. 8A is a figure showing an example using PDCP as a transmission protocol between the MBMS server and the mobile station.

FIG. 8A shows an example of a transmission route protocol between the MBMS server 400 and the mobile station 100. In this example, PDCP (Packet Data Convergence Protocol) or RLC (radio link control) is defined. The PDCP is a sublayer protocol of layer 2, and performs data conversion such as data compression of IP packets. RLC is a sublayer protocol in layer 2, and performs data separation/combining/reproduction, procedure control, retransmission control and the like.

Figure 8B:
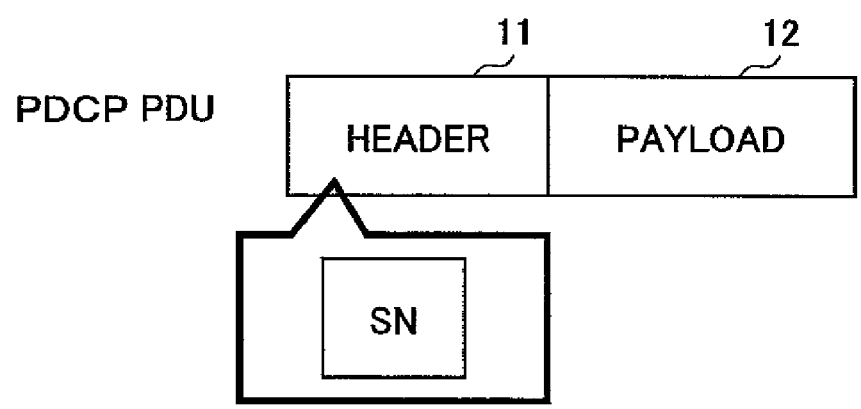
FIG. 8B is a figure showing a configuration example of PDCP-PDU.

FIG. 8B shows a configuration example of a PDU that is a unit of data, handled in UDP (user datagram protocol), defined in PDCP or RLC. In this example, the PDCP-PDU includes a header 11 and a payload 12. The header 11 stores a sequence number (SN) indicating which part of original data is stored in the PDU at least for detecting frame loss. The header 11 may store other elements such as an indicator other than the sequence number.

Although the configuration of the MBMS server 400 used in the radio communication system of the second embodiment is similar to that of the MBMS server of the first embodiment described with reference to FIG. 3, as processes to be performed, the cable transmission unit 404 performs processes specific to cable transmission necessary for performing transmission using the transmission protocol (PDCP, for example) defined between the MBMS server 400 and the mobile station 100. The transmission protocol setting unit 406 generates PDU of PDCP defined between the MBMS server 400 and the mobile station 100, for example.

Figure 9:
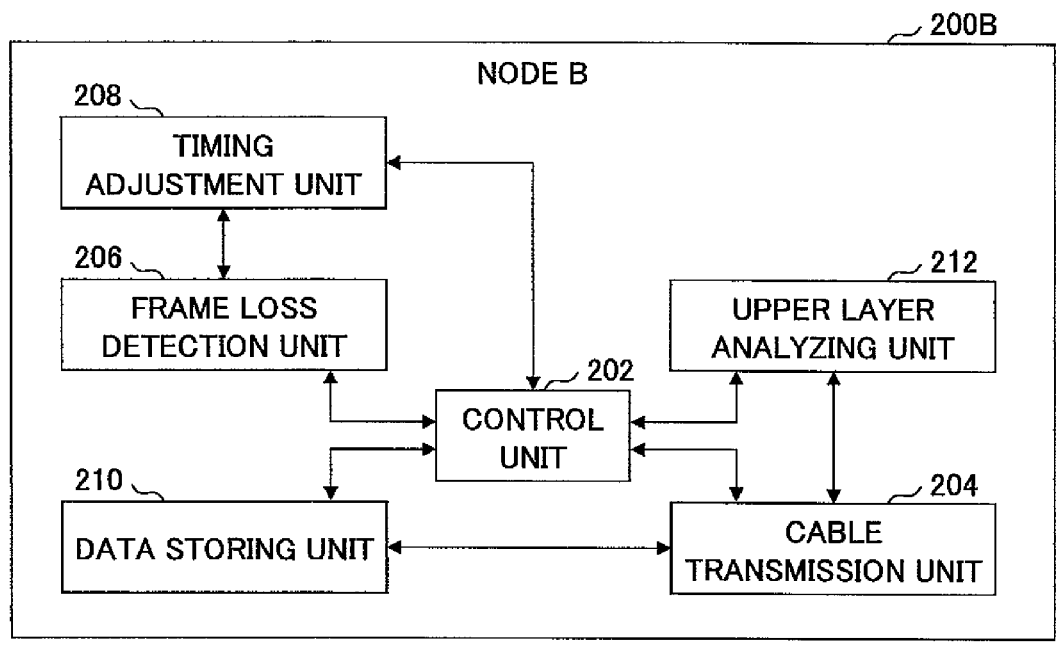
FIG. 9 is a schematic block diagram of the radio base station used in the second embodiment.

FIG. 9 is a schematic block diagram of the radio base station 200B used in the radio communication system of the second embodiment. The radio base station 200B includes a control unit 202, a cable transmission unit 204, a frame loss detection unit 206, a timing adjustment unit 208, a data storing unit 210 and an upper layer analyzing unit 212. The cable transmission unit 204 is connected to the data storing unit 210 and the upper layer analyzing unit 212, and the frame loss detection unit 206 is connected to the timing adjustment unit 208.

The upper layer analyzing unit 212 analyzes a header of the U-plane protocol, that is, PDCP and RLC for example, terminated between the MBMS server 400 and the mobile station 100.

The frame loss detection unit 206 detects a dropout (frame loss) of a sequence number added to the header of the U-plane protocol that is terminated between the MBMS server 400 and the mobile station 100, that is, detects a sequence number provided to a lost PDU.

The timing adjustment unit 208 calculates a lost data amount based on PDCP-PDU and a number of dropped sequence numbers according to dropouts of the sequence numbers detected by the frame loss detection unit 206 such that MEMS data the same as that in adjacent cells can be transmitted to a residing mobile station. In addition, the timing adjustment unit 208 changes transmission timing for the mobile station 100 according to a number of dropped sequence numbers, that is, according to a number of sequence numbers corresponding to lost PDUs based on a transport block size (TBS) indicating a data amount that can be transmitted within 1 TTI (Transmission Time Interval) when using the radio channel.

For example, the timing adjustment unit 208 counts a number of TTIs or a number of slots that should be skipped as transmission timing according to the number of sequence numbers corresponding to lost PDUs, so as to calculate a change amount of the transmission timing. By the way, one TTI may include a plurality of slots.

The data storing unit 210 stores MBMS data that is transmitted from the MBMS server 400 while transmission (distribution) of MBMS data to the mobile station 100 is being skipped. For example, the data storing unit 210 stores MBMS data received via the cable transmission unit 204.

Operation of the MBMS server 400 used in the second embodiment is the same as operation described in the first embodiment with reference to FIG. 5. However, in the second embodiment, a transmission protocol that is PDCP or RLC, for example, is predefined for transmitting MBMS data sent by the MBMS server 400 on the transmission route between the MBMS server 400 and the mobile station 100.

Figure 10:
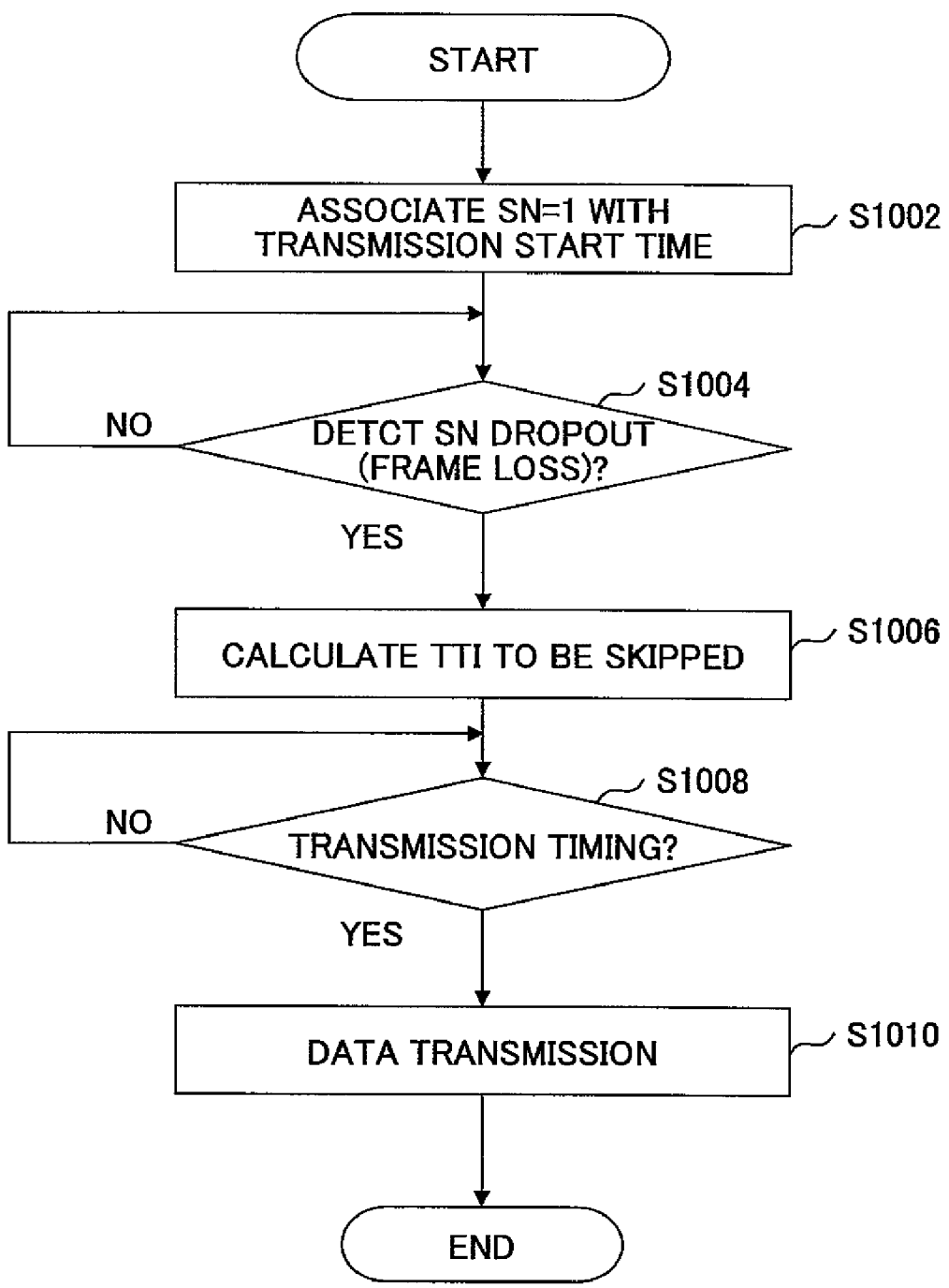
FIG. 10 is a flowchart showing operation of the radio base station in the second embodiment.

FIG. 10 shows a flowchart showing operation of the radio base station 200B used in the second embodiment. The radio base station 200B transmits MBMS data provided from the MBMS server 400 connected to a communication network, that is the core network 50, for example, to a plurality of mobile stations.

Based on PDU forming the MBMS data transmitted from the MBMS server 400, the control unit 202 associates an initial value (SN=1, for example) of the sequence number stored in the PDU with a transmission time (absolute time) specified from the MBMS server 400 (step S1002). As a result, radio base stations synchronize with each other based on the absolute time, so that each radio base station transmits same MBMS data at a same timing according to the sequence number associated with the transmission time. In the following, each radio base station performs processes based on this transmission time.

Next, the upper layer analyzing unit 212 analyzes a sequence number stored in u-plane protocol that is PDCP, for example, transmitted from the MBMS server 400 to the mobile station 100. The information indicating the sequence number is provided to the frame loss detection unit 206.

The frame loss detection unit 206 determines whether there is a dropout of the sequence number, that is, determines whether there is any lost PDU based on the provided information indicating the sequence number (step S1004).

When a dropout of the sequence number is detected, that is, when there is a lost PDU (YES in S1004), the timing adjustment unit 208 calculates a lost data amount based on sequence numbers and PDU of the U-plane protocol. Then, the timing adjustment unit 208 obtains a number of TTIs that should be skipped (change amount of transmission timing) so as to determine next transmission timing based on the number of sequence numbers corresponding to lost PDUs (step S1006).

The method for obtaining the change amount of the transmission timing (number of TTIs to be skipped, for example) is the same as that in the first embodiment. Assuming that a data amount that can be transmitted by 1 TTI is A bits, and that a data amount transmitted by the frame protocol is B bits. Also, it is assumed that the data amount B bits transmitted by FP are formed by combining a plurality of data units each being C bits. Then, relationship of C<A<B and C<A<2C holds true among these data amounts. That is, a case in which only one data unit can be transmitted within 1 TTI is assumed, and padding is performed for the remaining part. When only one sequence number is dropped, the number of TTIS to be skipped is [B/C].

When the dropout of the sequence number is not detected in step S1004, that is, when there is no lost PDU (No in S1004), the process returns to step S1004.

Next, the control unit 202 determines whether it is the transmission timing determined in step S1006 (step S1008). When it is the transmission timing (Yes in S1008), distribution of MBMS data is performed at the transmission timing (step S1010). On the other hand, when it is not the transmission timing (No in step S1008), the process returns to step S1008 and MBMS data after sequence number dropout continues to be held (stored) until the transmission timing comes.

Accordingly, when a transmission protocol is predefined for transmission of the MBMS data transmitted by the MBMS server 400 on a transmission route between the MBMS server 400 and the mobile station 100, the radio base station 200 detects loss of MBMS data, that is, frame loss, for example, between the MBMS server 400 and the radio base station 200B based on the sequence number obtained by analyzing the header, and changes transmission timing of the MBMS data for the mobile station according to the loss of MBMS data, so that it becomes possible to transmit the same MBMS data at the same timing among adjacent base stations. Therefore, the mobile station can perform soft combining efficiently among a plurality of base stations.

The present international application claims priority based on Japanese patent application No. 2005-267669, filed in the JPO on Sep. 14, 2005 and the entire contents of the Japanese patent application are incorporated herein by reference.

INDUSTRIAL APPLICABILITY

The radio base station and the user common data transmission method of the present invention can be applied to a radio communication system.

The invention claimed is:

1. A radio base station that transmits user common data provided from a user common data control apparatus connected to a communication network to a plurality of mobile stations by radio, comprising:
a frame loss detection unit configured to detect loss of user common data that occurs on a transmission route between the radio base station and the user common data control apparatus; and
a timing adjustment unit configured to change transmission timing of the user common data to be transmitted to the mobile station according to the loss of the user common data on the channel between the radio base station and the user common data control apparatus.

2. The radio base station as claimed in claim 1, wherein the frame loss detection unit detects the loss of the user common data based on a sequence number stored in each protocol data unit that is defined in a transmission route protocol, for transmitting the user common data, defined on the transmission route between the radio base station and the user common data control apparatus, and
the timing adjustment unit calculates a lost data amount based on the data unit and the sequence number so as to change the transmission timing according to the calculated data amount.

3. The radio base station as claimed in claim 2, the radio base station further comprising a control unit configured to associate an initial value of the sequence number transmitted from the user common data control apparatus with transmission time specified by the user common data control apparatus,
wherein the timing adjustment unit changes the transmission timing of the user common data for the mobile station based on the transmission time.

4. The radio base station as claimed in claim 2, wherein the timing adjustment unit calculates a number of transmission time intervals that should be skipped as the transmission timing according to the lost data amount.

5. The radio base station as claimed in claim 1, wherein the frame loss detection unit analyzes a header of a protocol data unit that is defined in a transmission route protocol, for transmission of the user common data, defined on a transmission route between the mobile station and the user common data control apparatus so as to detect loss of the user common data based on the sequence number stored in the header, and
the timing adjustment unit calculates a lost data amount based on the protocol data unit and the sequence number so as to change the transmission timing for the mobile station according to the calculated data amount.

6. The radio base station as claimed in claim 5, wherein the timing adjustment unit calculates a number of transmission time intervals that should be skipped as the transmission timing according to the lost data amount.

7. The radio base station as claimed in claim 5, the radio base station further comprising a control unit configured to associate an initial value of the sequence number transmitted from the user common data control apparatus with transmission time specified by the user common data control apparatus,
wherein the timing adjustment unit changes the transmission timing of the user common data for the mobile station based on the transmission time.

8. The radio base station as claimed in claim 1, wherein the timing adjustment unit calculates a number of transmission time intervals that should be skipped as the transmission timing according to the lost data amount.

9. A user common data transmission method for transmitting user common data provided from a user common data control apparatus connected to a communication network to a plurality of mobile stations, comprising:
a step of detecting, in the radio base station, loss of user common data on a transmission route between the radio base station and the user common data control apparatus;
a step of calculating a change amount of transmission timing according to the loss of the user common data between the radio base station and the user common data control apparatus;

a step of changing the transmission timing of the user common data to be transmitted to the mobile station based on the change amount; and a step of transmitting the user common data to the mobile station at the changed transmission timing.

10. The user common data transmission method as claimed in claim 9, further including a step of predefining a transmission route protocol for transmitting the user common data between the user common data control apparatus and the radio base station, wherein, the step of detecting data loss includes detecting loss of the user common data based on a sequence number stored in a protocol data unit defined in the transmission route protocol, and the step of calculating the change amount includes calculating an amount of lost data based on the data unit and the sequence number so as to calculate the change amount of the transmission timing according to the calculated data amount.

11. The user common data transmission method as claimed in claim 10, further comprising a step of associating, in the radio base station, associating an initial value of the sequence number transmitted from the user common data control apparatus with transmission time specified by the user common data control apparatus, wherein the timing adjustment step includes changing the transmission timing of the user common data for the mobile station based on the transmission time.

12. The user common data transmission method as claimed in claim 10, wherein the step of calculating the change amount includes calculating a number of transmission time intervals that should be skipped as the transmission timing according to the lost data amount.

13. The user common data transmission method as claimed in claim 9, further including a step of predefining a transmission route protocol for transmitting the user common data between the user common data control apparatus and the mobile station, wherein, the step of detecting data loss includes analyzing a header of a protocol data unit defined in the transmission route protocol to detect loss of the user common data based on a sequence number stored in the header, and the step of calculating the change amount includes calculating a lost data amount based on the data unit and the sequence number to calculate the change amount of the transmission timing according to the data amount.

14. The user common data transmission method as claimed in claim 13, wherein the step of calculating the change amount includes calculating a number of transmission time intervals that should be skipped as the transmission timing according to the lost data amount.

15. The user common data transmission method as claimed in claim 13, further comprising a step of associating, in the radio base station, associating an initial value of the sequence number transmitted from the user common data control apparatus with transmission time specified by the user common data control apparatus, wherein the timing adjustment step includes changing the transmission timing of the user common data for the mobile station based on the transmission time.

16. The user common data transmission method as claimed in claim 9, wherein the step of calculating the change amount includes calculating a number of transmission time intervals that should be skipped as the transmission timing according to the lost data amount.

* * * * *